US011162256B1

(12) United States Patent
Miller

(10) Patent No.: US 11,162,256 B1
(45) Date of Patent: *Nov. 2, 2021

(54) SELF-BRACING, TWO-WAY MOMENT FRAME PRECAST SYSTEM FOR INDUSTRIAL SUPPORT STRUCTURE AND METHOD OF UTILIZING SAME

(71) Applicant: Philip Glen Miller, Lake Charles, LA (US)

(72) Inventor: Philip Glen Miller, Lake Charles, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/914,854

(22) Filed: Jun. 29, 2020

Related U.S. Application Data

(62) Division of application No. 14/870,183, filed on Sep. 30, 2015, now Pat. No. 10,738,463.

(60) Provisional application No. 62/057,753, filed on Sep. 30, 2014.

(51) Int. Cl.
| | |
|---|---|
| *E04B 1/58* | (2006.01) |
| *E04B 1/21* | (2006.01) |
| *F16B 12/24* | (2006.01) |
| *E04B 2/02* | (2006.01) |

(52) U.S. Cl.
CPC .............. *E04B 1/585* (2013.01); *E04B 1/215* (2013.01); *E04B 2002/0245* (2013.01); *F16B 12/24* (2013.01)

(58) Field of Classification Search
CPC .. E04B 1/585; E04B 1/215; E04B 2002/0245; E04B 1/2604; F16B 12/24; Y10T 403/46; Y10T 403/4602; E04C 5/165
See application file for complete search history.

(56) References Cited

U.S. PATENT DOCUMENTS

| | | |
|---|---|---|
| 422,901 A | 3/1890 | Arnett |
| 2,236,926 A | 4/1941 | Surface |
| 2,684,588 A | 7/1954 | Robertson |
| 2,844,848 A | 7/1958 | Couse et al. |
| 3,378,971 A | 4/1968 | Singer et al. |
| 3,429,092 A | 2/1969 | Hart et al. |
| 3,479,782 A | 8/1969 | Muse |
| 3,613,325 A | 10/1971 | Yee |
| 3,645,569 A | 2/1972 | Reilly |
| 3,693,307 A | 9/1972 | Muse |
| 3,818,671 A | 6/1974 | Matsushita et al. |
| 4,009,550 A | 3/1977 | Young |

(Continued)

FOREIGN PATENT DOCUMENTS

| | | |
|---|---|---|
| CN | 202731092 U | 2/2013 |
| EP | 1288382 | 3/2003 |

(Continued)

*Primary Examiner* — Basil S Katcheves
*Assistant Examiner* — Omar F Hijaz
(74) *Attorney, Agent, or Firm* — Katarzyna Brozynski; Antonio Devora

(57) ABSTRACT

A self-bracing, two-way moment frame precast system for industrial support structure and method of erecting a precast industrial support structure without temporary or permanent bracing or shoring are disclosed. This is accomplished by utilizing a moment frame element in two directions to create free standing tower that requires no bracing during erection or in service. The system also utilizes a connection that allows the erection crane to achieve alignment during erection such that the entire system can be erected by a ground based personnel.

19 Claims, 14 Drawing Sheets

(56) References Cited

U.S. PATENT DOCUMENTS

| | | | |
|---|---|---|---|
| 4,093,389 | A | 6/1978 | Wilbrow |
| 4,110,949 | A | 9/1978 | Cambiuzzi |
| 4,284,379 | A | 8/1981 | Chaiko |
| 4,474,493 | A | 10/1984 | Welch |
| 4,547,096 | A | 10/1985 | Daigle et al. |
| 4,632,473 | A | 12/1986 | Smith |
| 5,037,234 | A | 8/1991 | De Jong |
| 5,230,195 | A | 7/1993 | Sease |
| 5,342,138 | A | 8/1994 | Saito et al. |
| 5,660,492 | A | 8/1997 | Bathon |
| 5,729,948 | A | 3/1998 | Levy et al. |
| 5,881,515 | A | 3/1999 | George |
| 6,679,645 | B2 | 1/2004 | Kelly |
| 6,926,613 | B1 | 8/2005 | Binning |
| 6,991,397 | B2 | 1/2006 | Welch |
| 7,264,416 | B2 | 9/2007 | Kahl |
| 7,461,490 | B2 | 12/2008 | Toledo |
| 7,628,563 | B2 | 12/2009 | Winkler |
| 8,205,308 | B2 | 6/2012 | Moore |
| 8,511,033 | B2 | 8/2013 | Kumakawa et al. |
| 2008/0213040 | A1 | 9/2008 | Morze-Reichartz et al. |
| 2008/0263986 | A1 | 10/2008 | Cables |
| 2013/0312357 | A1 | 11/2013 | Lin |

FOREIGN PATENT DOCUMENTS

| | | |
|---|---|---|
| GB | 691722 | 5/1953 |
| GB | 1288088 | 9/1972 |
| WO | 1992014885 | 9/1992 |

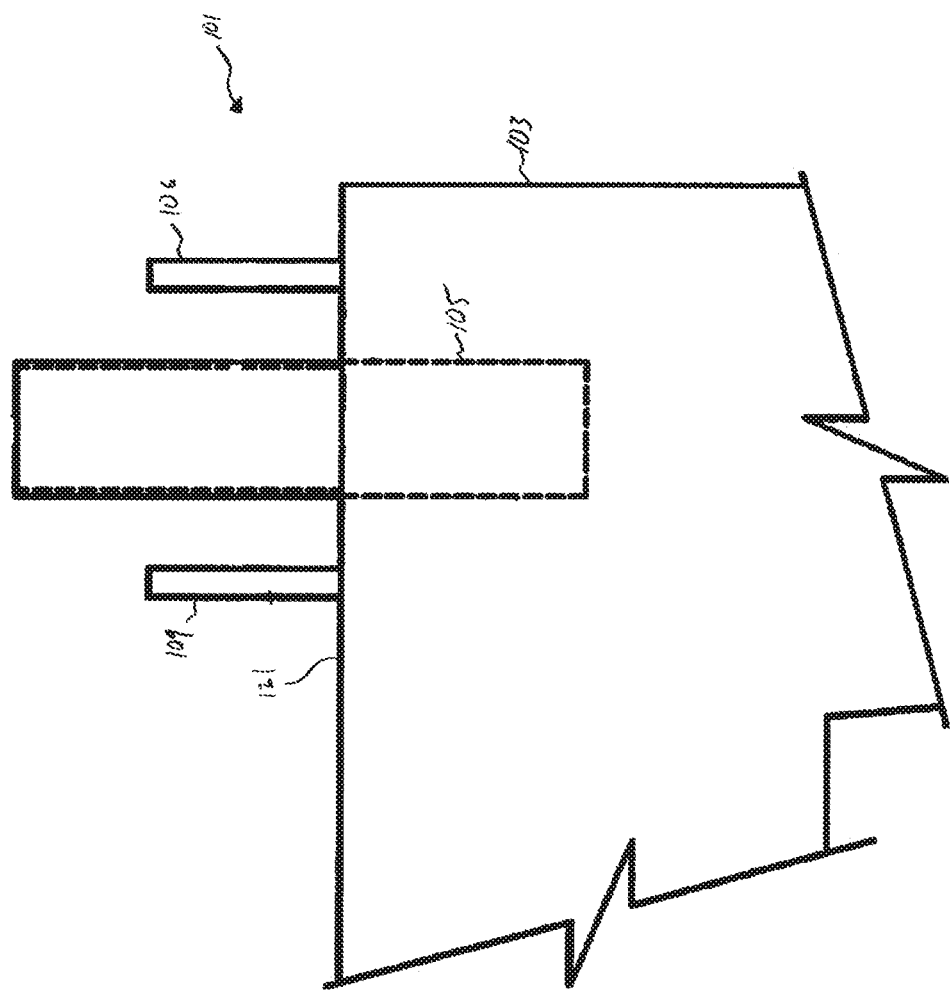

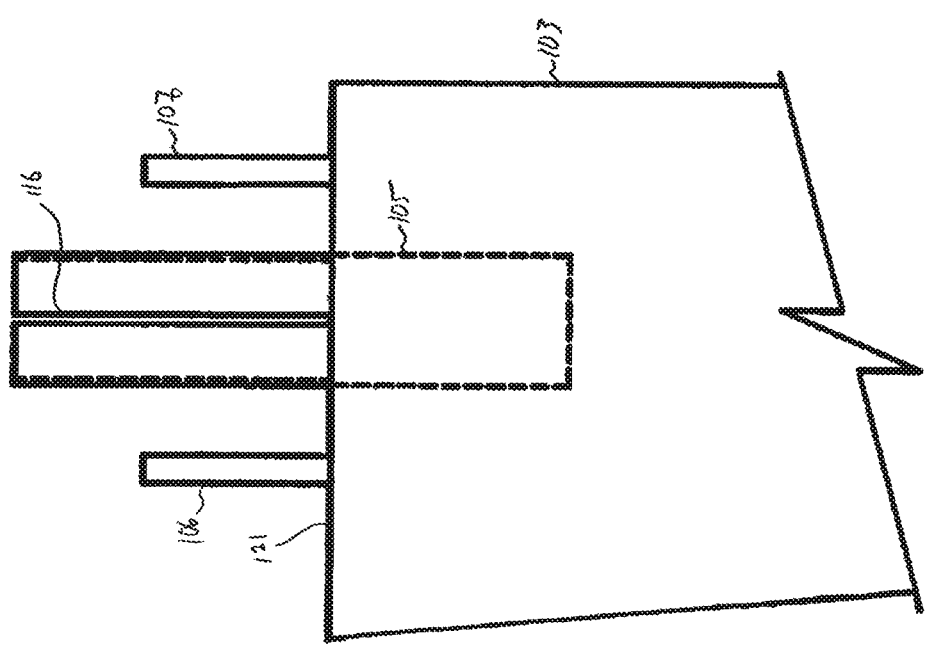

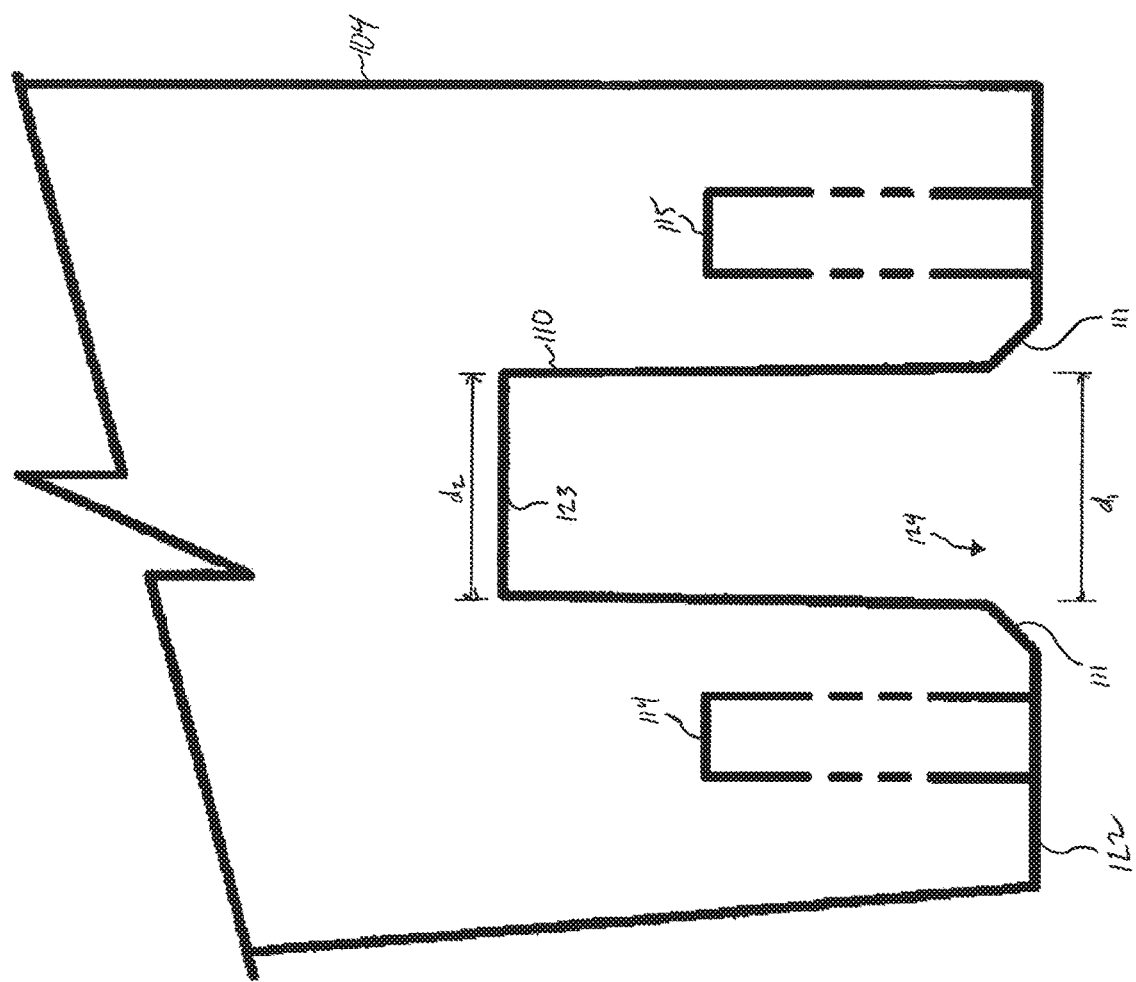

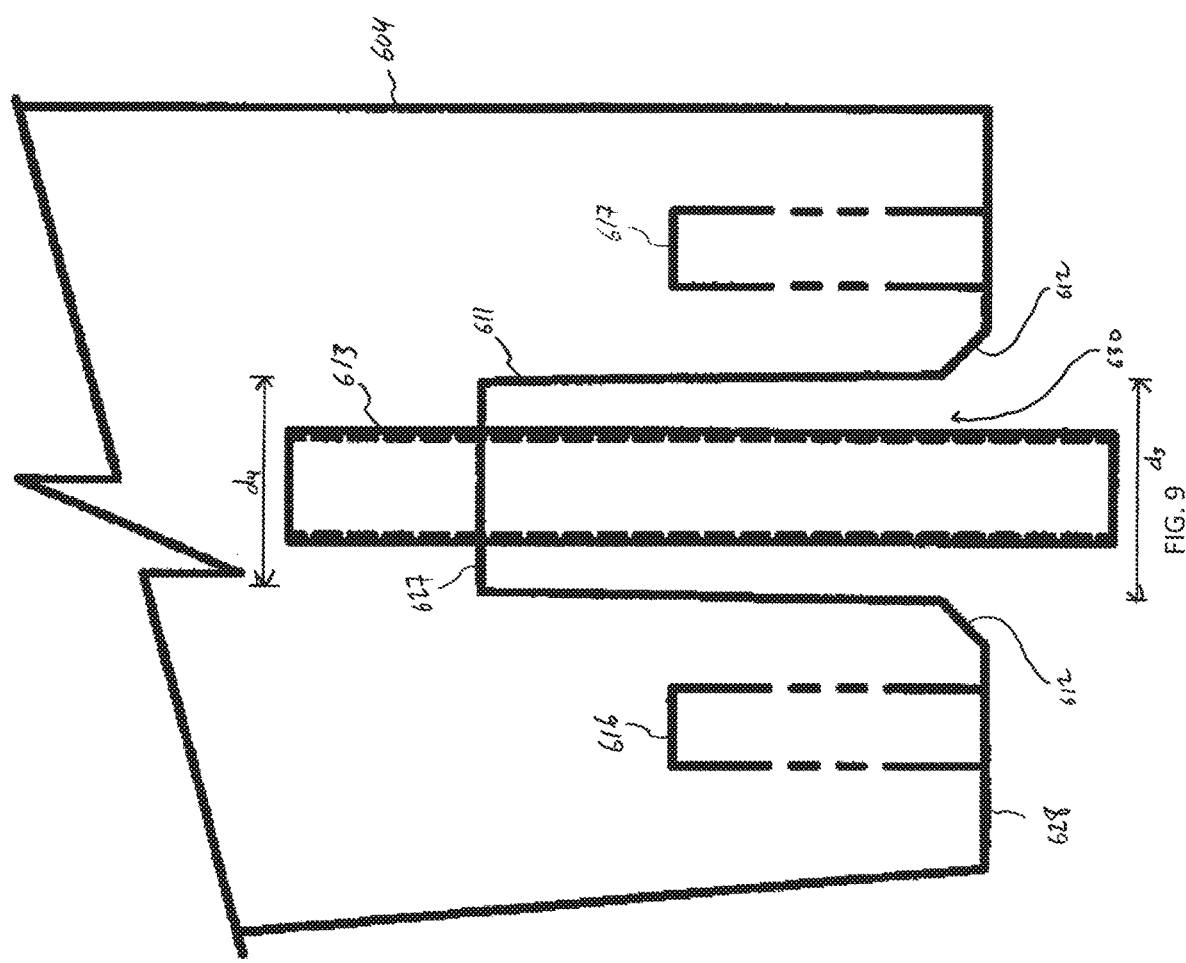

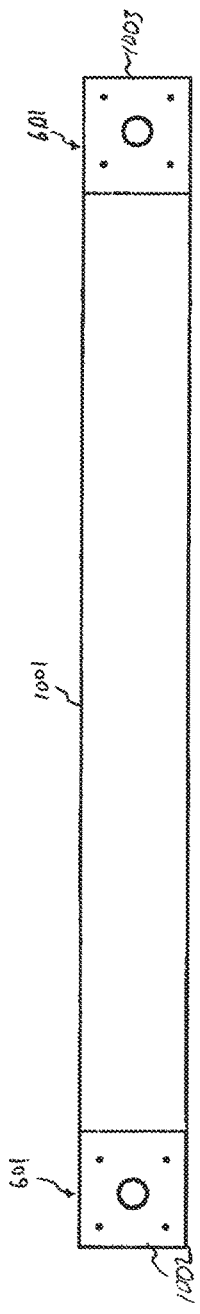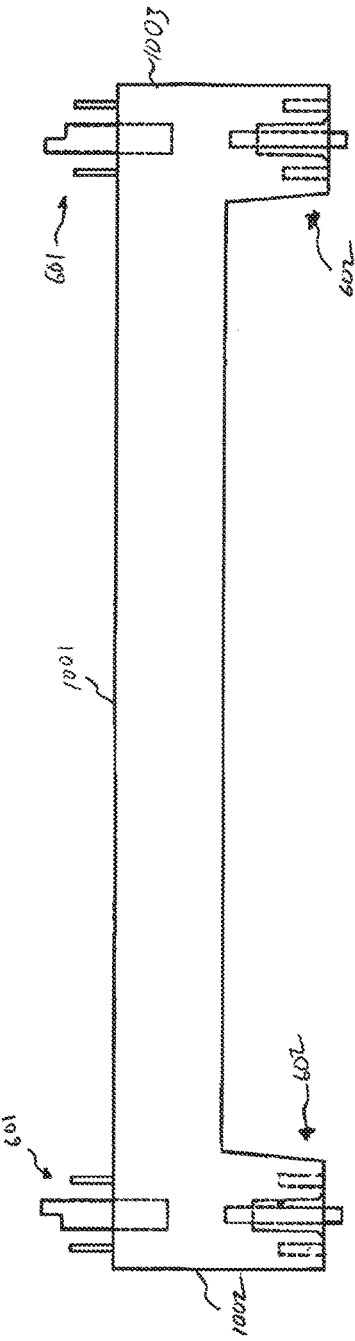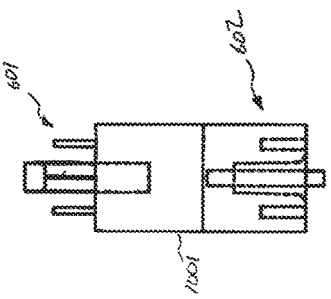
FIG. 10A
FIG. 10B
FIG. 10C

SELF-BRACING, TWO-WAY MOMENT FRAME PRECAST SYSTEM FOR INDUSTRIAL SUPPORT STRUCTURE AND METHOD OF UTILIZING SAME

CROSS-REFERENCE TO RELATED APPLICATIONS

This application is a divisional application of U.S. application Ser. No. 14/870,183, filed Sep. 30, 2015, which claims priority to U.S. Provisional Application No. 62/057,753, filed Sep. 30, 2014. Each of the above patent applications is incorporated herein by reference in its entirety to provide continuity of disclosure.

TECHNICAL FIELD

The present invention relates generally to industrial construction, and is particularly concerned with a precast industrial support structure.

BACKGROUND OF THE INVENTION

Currently, much of the cost and time related to support industrial structures during erection is for a temporary or permanent bracing or shoring in a transverse direction to achieve lateral stability. Those structures still utilize bracing (permanent or temporary) in the longitudinal direction as well for stability in that axis. The temporary bracing must be then removed after all structural connections are established. There is also cost and danger involved in having builders work on temporary bracing or shoring, and for the cost of a crane to lift additional construction material up to the builders.

Another consideration related to erecting the structure is the ease and effectiveness with which such structures may be erected with simple utilization of the crane and no additional man power at the work site. One task which adds to the time, safety, complexity and cost of constructions is having additional members of a construction crew to assist the crane operator in aligning the connection of the construction.

Accordingly, a need exists for a system and method of erecting an industrial structure to avoid costs related to temporary and permanent bracing or shoring. With a novel two-way, self-bracing and aligning system, any additional man power and cost is eliminated.

SUMMARY

A self-bracing and self-aligning, two-way moment frame precast system for industrial support structures is disclosed. A method of erecting a pre-cast industrial support structure without temporary or permanent bracing or shoring in the longitudinal and transverse directions for lateral stability is further disclosed that utilizes a set of moment frame members in two directions to create a free-standing structure that requires no bracing during erection or in service.

A two-way moment frame member includes a beam, a set of connector portions attached to the beam, a male connector that includes a collapsible stabilizer attached to each connector portion, and a set of rebars attached to each connector portion and adjacent to the collapsible stabilizer. A female connector positioned opposite the male connector includes a stabilizer receiver attached to each connector portion, and a set of sleeves attached to each connector portion and adjacent to the stabilizer receiver.

A connection system for a two-way moment frame member including a stabilizer receiver, a set of sleeves adjacent to the stabilizer receiver, a collapsible stabilizer sized to at least partially collapse when engaged with the stabilizer receiver, a slot integrally formed in the collapsible stabilizer, and a set of rebars adjacent to the collapsible stabilizer.

A free-standing two-way moment support structure includes a base structure, a set of moment frame members connected to the base structure, each moment frame member includes a beam, a set of connector portions attached to the beam, a collapsible stabilizer attached to each connector portion, a set of rebars attached to each connector portion and adjacent to the collapsible stabilizer, a stabilizer receiver integrally formed in each connector portion opposite the collapsible stabilizer, and a set of sleeves integrally formed in each connection portion opposite the set of rebars.

In particular, according to one embodiment of the present invention, the slotted stabilizer at least partially collapses in the stabilizer receiver and causes a friction fit between the stabilizer and the stabilizer receiver to eliminate the need for temporary bracing by providing stability during erection.

The disclosed embodiments provide a self-bracing, self-aligning, two-way moment frame precast system for an industrial support structure which is very competitive from a mere economic standpoint. More importantly, combination of a self-aligning alignment pin connection with remote crane release devices eliminates engaging personnel at high elevation and substantially improves in erection safety as it allows such alignment to be performed in the air.

BRIEF DESCRIPTION OF THE DRAWINGS

In the detailed description below, reference will be made to the following drawings.

FIG. 2 is a front view of the male connector of one embodiment.

FIG. 3 is a side view of the male connector of one embodiment.

FIG. 4 is a detail section view of the female connector of one embodiment.

FIG. 9 is a detail section view of a female connector of another embodiment.

FIGS. 10A, 10B, and 10C show a top view, a front view, and a side view, respectively, of a moment frame member of another embodiment.

DETAILED DESCRIPTION

Figure 1:
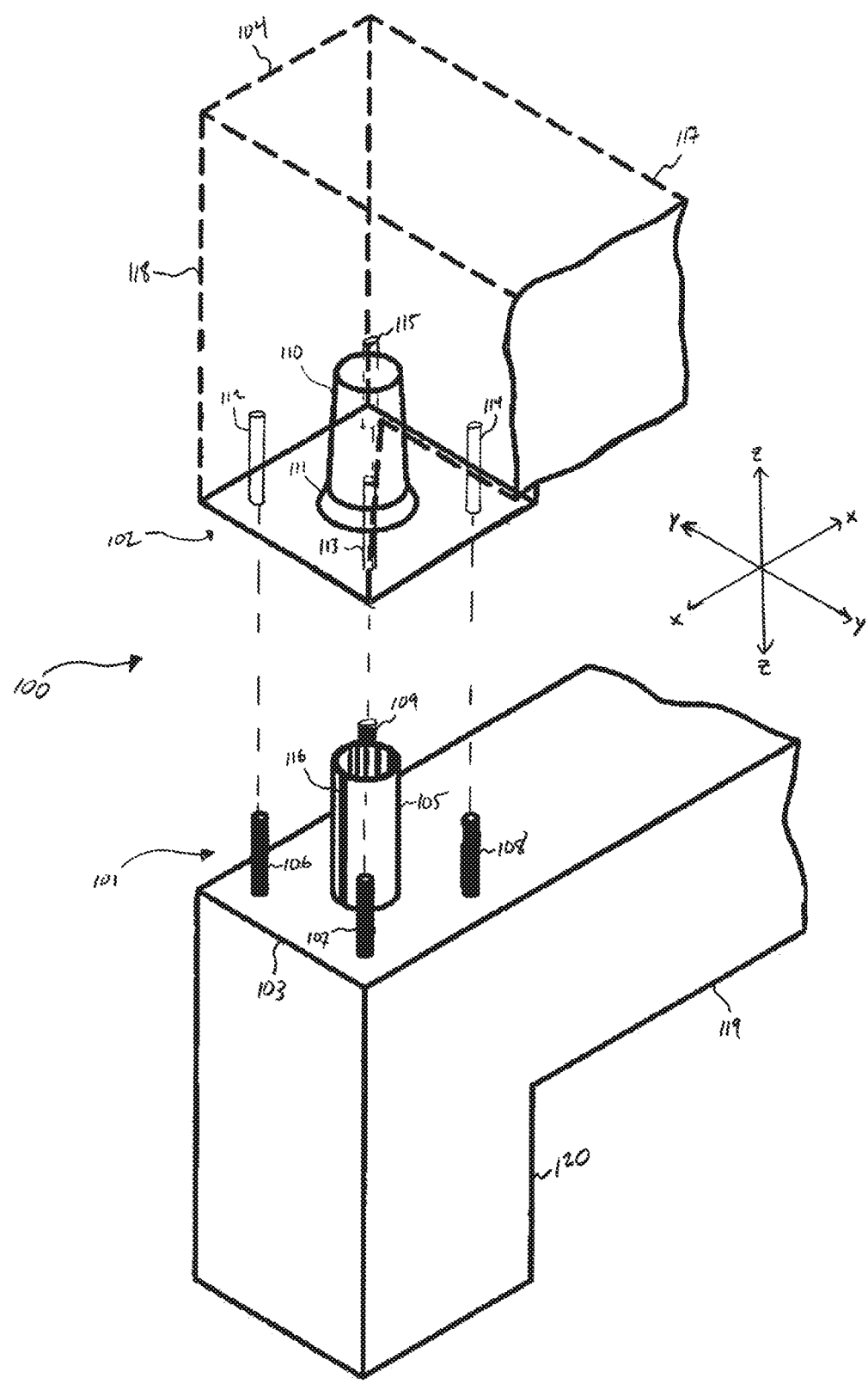
FIG. 1 is a perspective view of a male connector and a female connector of a connection system of one embodiment.

Referring to FIG. 1 in one embodiment, connection system 100 includes male connector 101 and female connector 102. Male connector 101 includes stabilizer 105 attached to moment frame member 103 and a set of rebars 106, 107, 108, and 109 attached to moment frame member 103 and adjacent to stabilizer 105. Moment frame member 103 includes beam portion 119 and connector portion 120. In a preferred embodiment, beam portion 119 extends generally along the x-axis and connector portion 120 extends generally along the z-axis. In a preferred embodiment, beam portion 119 and connector portion 120 are generally perpendicular with respect to each other. Other angles may be employed. In a preferred embodiment, stabilizer 105 includes slot 116 integrally formed therein and extends in a generally longitudinal direction along stabilizer 105.

Female connector 102 includes stabilizer receiver 110 and a set of sleeves 112, 113, 114 and 115, integrally formed in moment frame member 104. Each of set of sleeves 112, 113, 114, and 115 is sized to accommodate set of rebars 106, 107, 108, and 109, respectively. Stabilizer receiver 110 includes taper 111. Moment frame member 104 includes beam portion 117 and connector portion 118. In a preferred embodiment, beam portion 117 extends generally along the y-axis and connector portion 118 extends generally along the z-axis. In a preferred embodiment, beam portion 117 and connector portion 118 are generally perpendicular with respect to each other.

In a preferred embodiment, each of moment frame members 103 and 104 is made of concrete, preferably pre-cast concrete. Other materials may be employed.

In a preferred embodiment, stabilizer 105 is a generally cylindrical hollow tube. Other shapes may be employed.

In a preferred embodiment, stabilizer 105 is made of a durable material such as a metal or metal alloy. Other materials known in the art, such as plastics may be employed.

In a preferred embodiment, each of set of rebars 106, 107, 108, and 109 is made of a durable and rigid material such as steel. Other suitable materials known in the art may be employed.

In a preferred embodiment, each of set of rebars 106, 107, 108, and 109, is cast-in or drilled and grouted into moment frame member 103. Other means of attachment known in the art may be employed.

In a preferred embodiment, stabilizer receiver 110 has a generally frustoconical shape. Other shapes, such as generally cylindrical, may be employed.

In a preferred embodiment, stabilizer receiver 110 and taper 111 are pre-cast formed into moment frame member 104. In another embodiment, stabilizer receiver 110 and taper 111 are cut, drilled, and/or machined into moment frame member 104. Other means for attachment may be employed.

In a preferred embodiment, set of sleeves 112, 113, 114, and 115, is cast-in or drilled and grouted into pre-cast element 104. In other embodiments, set of sleeves 112, 113, 114, and 115, are pre-cast into moment frame member 104. Other means of attachment known in the art may be employed.

In use, male connector 101 is received into female connector 102. Stabilizer 105 inserts into stabilizer receiver 110 and each of the set of rebars 106, 107, 108, and 109, insert into sleeves 112, 113, 114, and 115, respectively. Stabilizer 105 is at least partially collapsed via slot 116 as it engages with stabilizer receiver 110, thereby enabling a frictional fit between male connector 101 and female connector 102 and eliminating a need for temporary bracing. As can be seen, connection system 100 substantially reduces or eliminates a first moment about the x-axis and a second moment about the y-axis, thereby eliminating a need for temporary bracing along the x-axis and the y-axis when compared to the prior art.

Referring to FIGS. 2 and 3, stabilizer 105 extends into moment frame member 103 beyond surface 121 of moment frame member 103. Slot 116 of stabilizer 105 extends along a generally longitudinal direction of stabilizer 105 to generally abut surface 121. In other embodiments, slot 116 extends to a position adjacent to surface 121.

Referring to FIG. 4, stabilizer receiver 110 is integrally formed in moment frame member 104. Taper 111 is adjacent to surface 122 of moment frame member 104 and adjacent to receiver 110. Sleeves 114 and 115 extend into pre-cast element 104 beyond surface 122. Stabilizer receiver 110 further includes end surface 123 and opening 124. Opening 124 has diameter $d_1$ and end surface has diameter $d_2$.

In a preferred embodiment, diameter $d_2$ is less than diameter $d_1$. In another embodiment, diameter $d_2$ is approximately equal to diameter $d_1$.

In a preferred embodiment, $d_1$ is less than the diameter of stabilizer 105.

In a preferred embodiment, taper 111 has a generally flat surface surrounding stabilizer receiver 110. In another embodiment, taper 111 has a curved surface. Other shapes may be employed.

In a preferred embodiment, taper 111 provides a generally chamfered surface to enable a better fit and connection for stabilizer receiver 110.

Figure 5A:
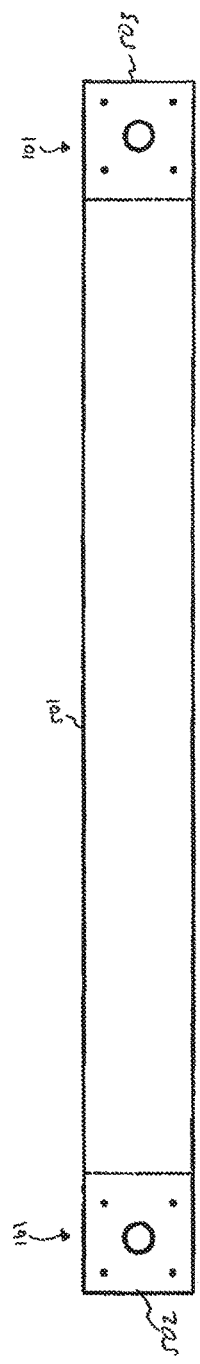
FIGS. 5A, 5B, and 5C show a top view, a front view, and a side view, respectively, of a moment frame member of one embodiment.
Figure 5B:
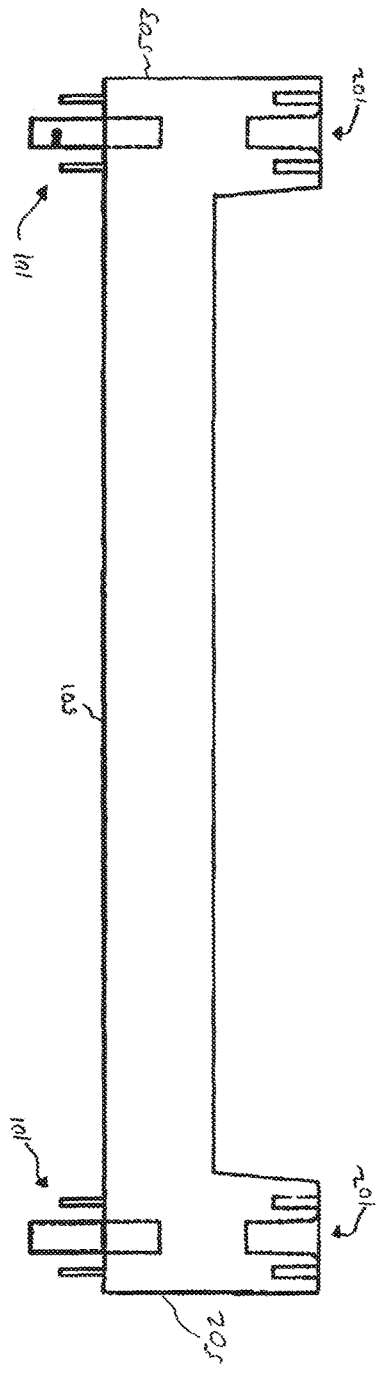
Figure 5C:
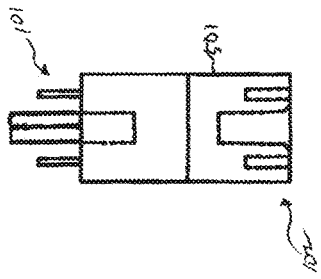

Referring to FIGS. 5A, 5B, and 5C, moment frame member 500 includes beam 501 and connector portions 502 and 503 attached to beam 501. Each of connector portions 502 and 503 includes male connector 101 and female connector 102. Male connector 101 is positioned opposite female connector 102. In this way, a set of moment frame members 500 is stacked and/or positioned generally perpendicular with respect to each other to modularly assemble a pre-cast structure, as will be further described below.

Figure 6:
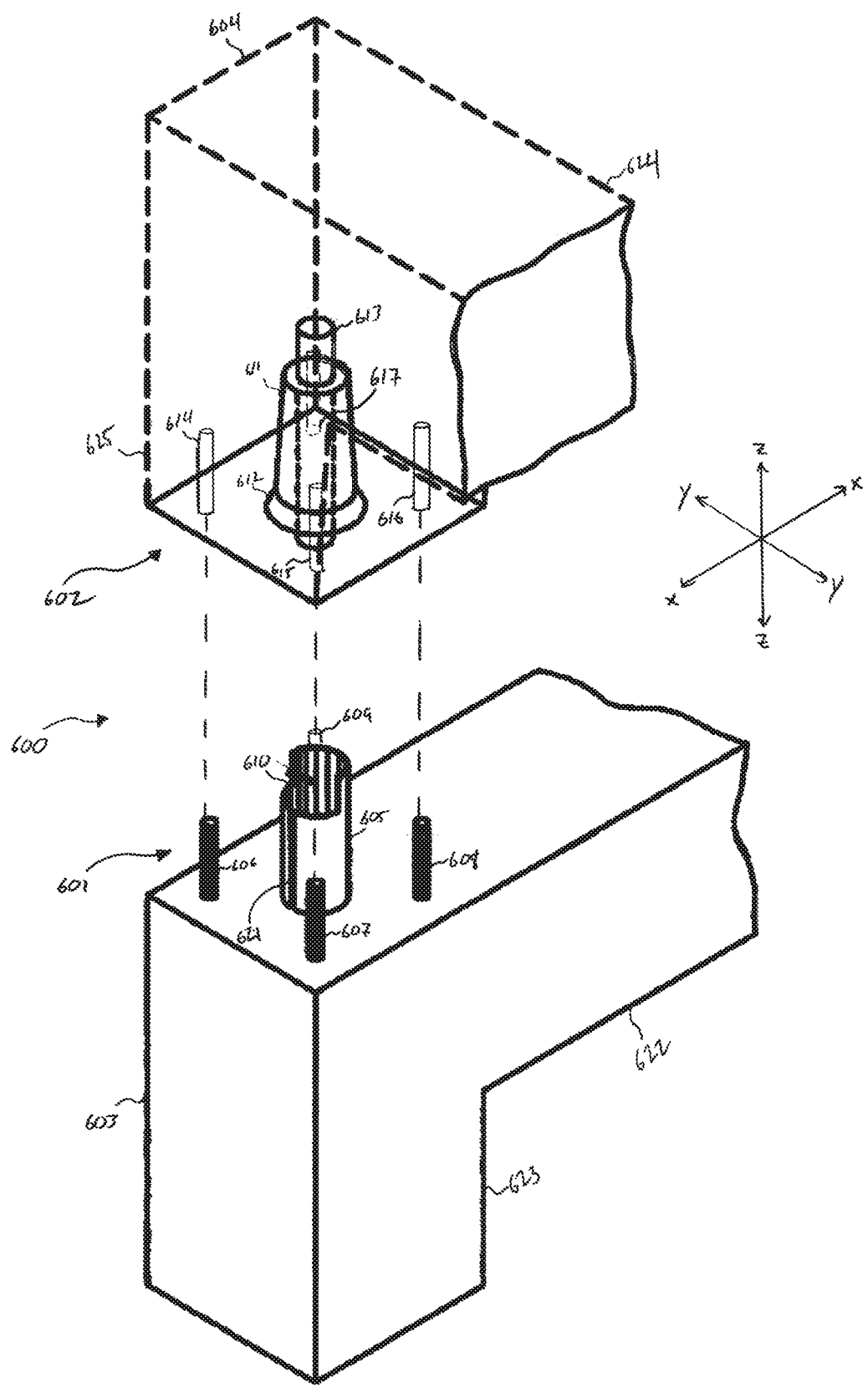
FIG. 6 is a perspective view of a male connector and a female connector of a connection system of another embodiment.

Referring to FIG. 6 in another embodiment, connection system 600 includes male connector 601 and female connector 602. Male connector 601 is attached to moment frame member 603 and includes stabilizer 605 attached to moment frame member 603 and a set of rebars 606, 607, 608, and 609 attached to moment frame member 603. Moment frame member 603 includes beam portion 622 and connector portion 623. Beam portion 622 extends generally along the x-axis and connector portion 623 extends generally along the z-axis. In a preferred embodiment, beam portion 622 and connector portion 623 are generally perpendicular with respect to each other. Other angles may be employed. Stabilizer 605 includes slot 621, integrally formed therein and extends in a generally longitudinal direction along stabilizer 605. Stabilizer 605 further includes notch 610 integrally formed therein.

Female connector 602 includes stabilizer receiver 611 and set of sleeves 614, 615, 616, and 617, integrally formed into moment frame member 604. Each of set of sleeves 614, 615, 616, and 617 is sized to accommodate set of rebars 606, 607, 608, and 609, respectively. Moment frame member 604 includes beam portion 624 extending generally along the y-axis and connector portion 625 extending generally along the z-axis.

In one embodiment, stabilizer receiver 611 includes stabilizer pin 613 connected to stabilizer receiver 611.

In a preferred embodiment, each of moment frame members 603 and 604 is made of concrete, preferably pre-cast concrete. Other materials may be employed.

In a preferred embodiment, stabilizer 605 is made of a durable material such as a metal or a metal alloy. In a preferred embodiment, stabilizer 605 is a hollow generally cylindrical tube. Other materials and shapes known in the art may be employed.

In a preferred embodiment, each of set of rebars 606, 607, 608, and 609 are made of a durable and rigid material such as steel. Other suitable materials known in the art may be employed.

In a preferred embodiment, each of stabilizer 605 and set of rebars 606, 607, 608, and 609 is cast-in or drilled and grouted into moment frame member 603. Other means for attachment known in the art may be employed.

In a preferred embodiment, each of stabilizer receiver 611 and set of sleeves 614, 615, 616, and 617 is cast-in or drilled and grouted into moment frame member 604. Other means for attachment such as cutting, drilling, and/or machining known in the art may be employed.

In a preferred embodiment, stabilizer receiver 611 has a generally frustoconical shape. Other shapes may be employed.

In a preferred embodiment, stabilizer pin 613 is made of a durable and rigid material such as steel. In another embodiment, stabilizer is made of concrete, preferably pre-cast concrete. Other suitable materials may be employed.

In a preferred embodiment, stabilizer pin 613 is cast-in or drilled and grouted into moment frame member 604. Other means for attachment known in the art may be employed.

In use, stabilizer 605 is inserted into stabilizer receiver 611 and stabilizer pin 613 is inserted into stabilizer 605. Stabilizer 605 at least partially collapses via slot 621 upon engagement with stabilizer receiver 611 to provide a frictional fit between stabilizer 605 and stabilizer receiver 611. Notch 610 provides an opening to more easily insert stabilizer pin 613 into stabilizer 606, for example, lateral movement of stabilizer pin 613. Likewise, set of rebars 606, 607, 608, and 609, is inserted into sleeves 614, 615, 616, and 617, respectively. As can be seen, connection system 600 substantially reduces and/or prevents movement in the form of a moment about the y-axis and a moment about the x-axis, thereby eliminating the need for temporary and/or permanent bracing along the x-axis and/or the y-axis when compared to the prior art.

Figure 7:
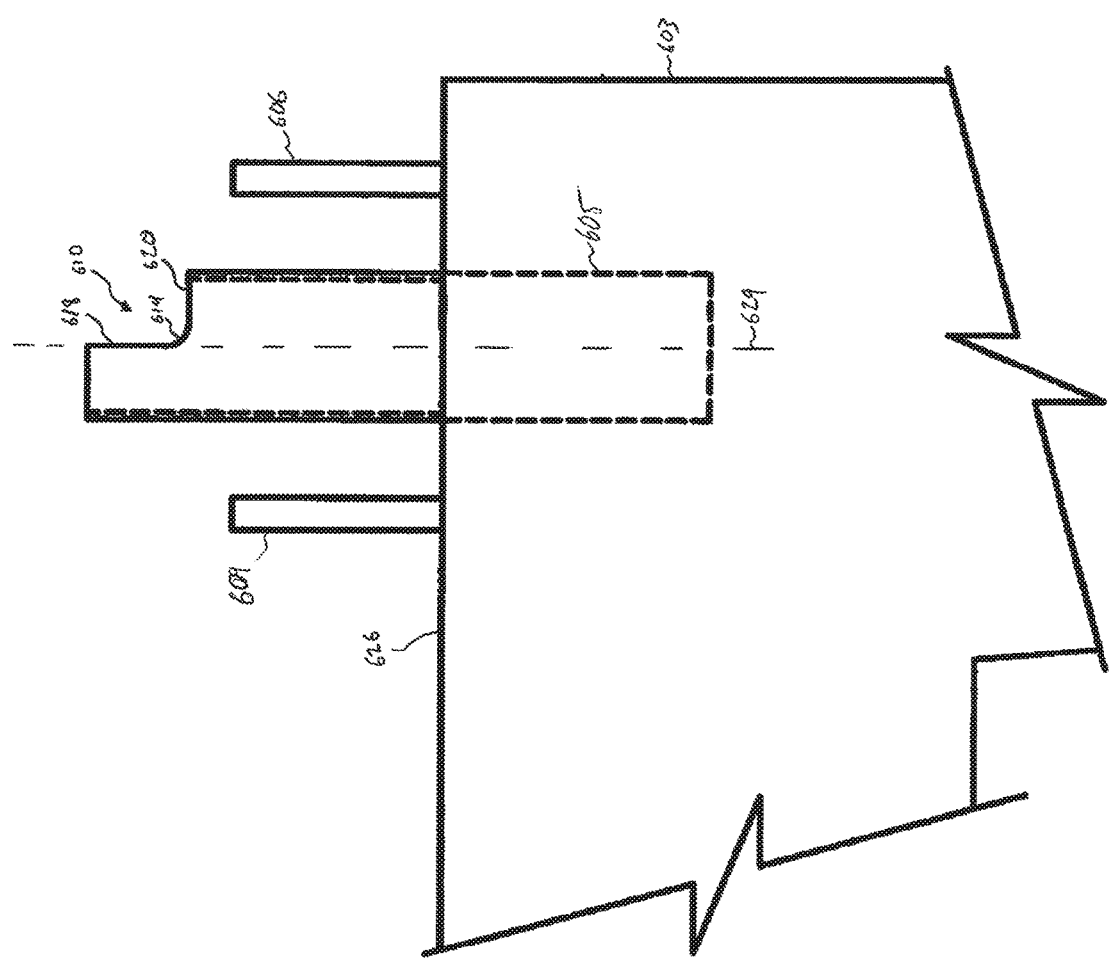
FIG. 7 is a front view of the male connector of another embodiment.
Figure 8:
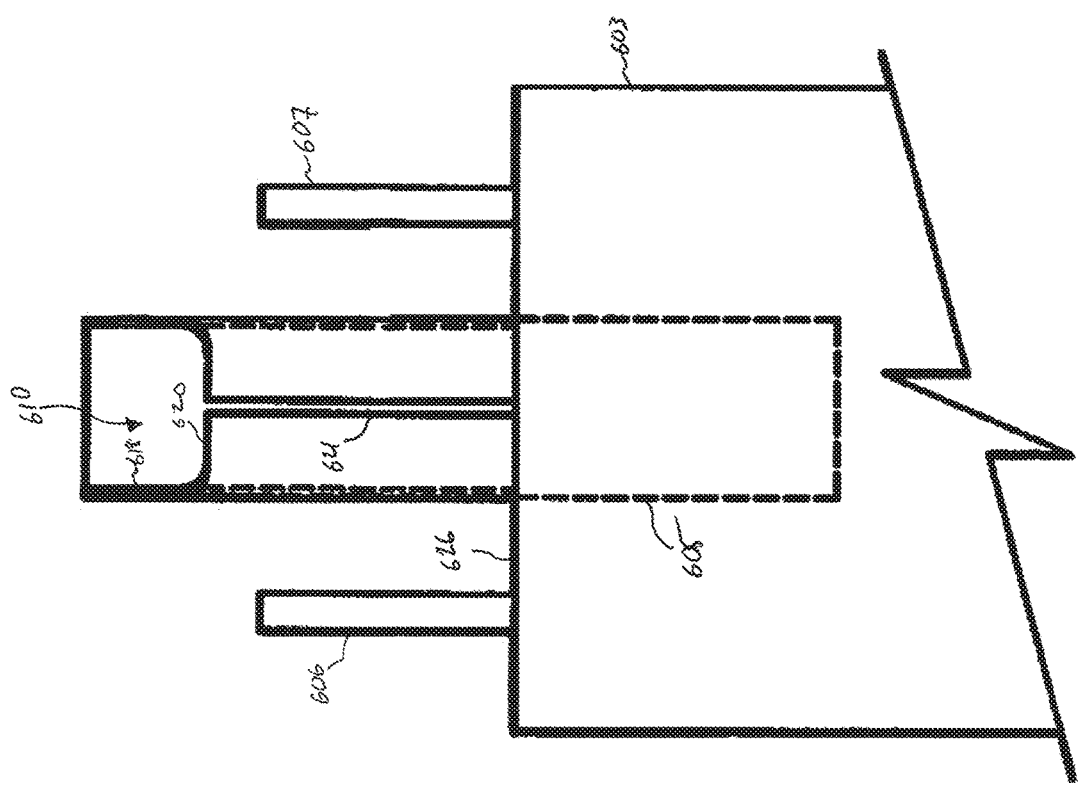
FIG. 8 is a side view of the male connector of another embodiment.

Referring to FIGS. 7 and 8, notch 610 of stabilizer 605 includes edges 618 and 620, connected to each other by transition 619. In a preferred embodiment, transition 619 is generally curved. In another embodiment, transition 619 is a point, thereby edges 618 and 620 meet at a corner.

Stabilizer 605 extends into moment frame member 603 beyond surface 626 of moment frame member 603. Slot 621 of stabilizer 605 extends in a generally longitudinal direction along stabilizer 605 to generally abut surface 626. In other embodiments, slot 621 extends to a position adjacent to surface 626. In a preferred embodiment, edge 618 defines a generally diametrical plane that generally aligns with axis 629 of stabilizer 605.

Referring to FIG. 9, stabilizer receiver 611 includes taper 612 adjacent to surface 628 of moment frame member 604 and to stabilizer receiver 611. Stabilizer receiver 611 further includes opening 630 and end surface 627. Opening 630 has diameter $d_3$ and end surface 627 has diameter $d_4$. In a preferred embodiment, diameter $d_4$ is less than diameter $d_3$. In another embodiment, diameter $d_4$ is approximately equal to diameter $d_3$. In a preferred embodiment, stabilizer 613 inserts into pre-cast element 604 beyond end surface 627. In another embodiment, stabilizer pin 613 is attached to end surface 627. Stabilizer pin 613 is generally concentrically aligned with receiver 611 and extends from moment frame member 604 beyond surface 628.

In a preferred embodiment, stabilizer pin 617 has a diameter less than stabilizer 605.

In a preferred embodiment, stabilizer receiver 611 has a generally frustoconical shape. Other shapes such as generally cylindrical known in the art may be employed.

In a preferred embodiment, taper 612 has a generally flat surface surrounding stabilizer receiver 611. Other shapes, such as a rounded corner may be employed. In a preferred embodiment, taper 612 provides a chamfered surface to stabilizer receiver 611.

Referring to FIGS. 10A, 10B and 10C, moment frame member 1000 includes beam portion 1001 and connector portions 1002 and 1003. Each of connector portions 1002 and 1003 includes male connector 601 and female connector 602. Male connector 601 and female connector 602 are arranged generally opposite with respect to each other.

In this way, a set of moment frame members 1000 is stacked and/or positioned generally perpendicular with respect to each other to provide a modular connection arrangement for the set of moment frame members 1000 as will be further described below. As will be appreciated by those skilled in the art, moment frame member 1000 having connector portions 1002 and 1003 provide a pre-cast modular building product to build modular concrete structures in a more efficient manner than that of the prior art.

Figure 11A:
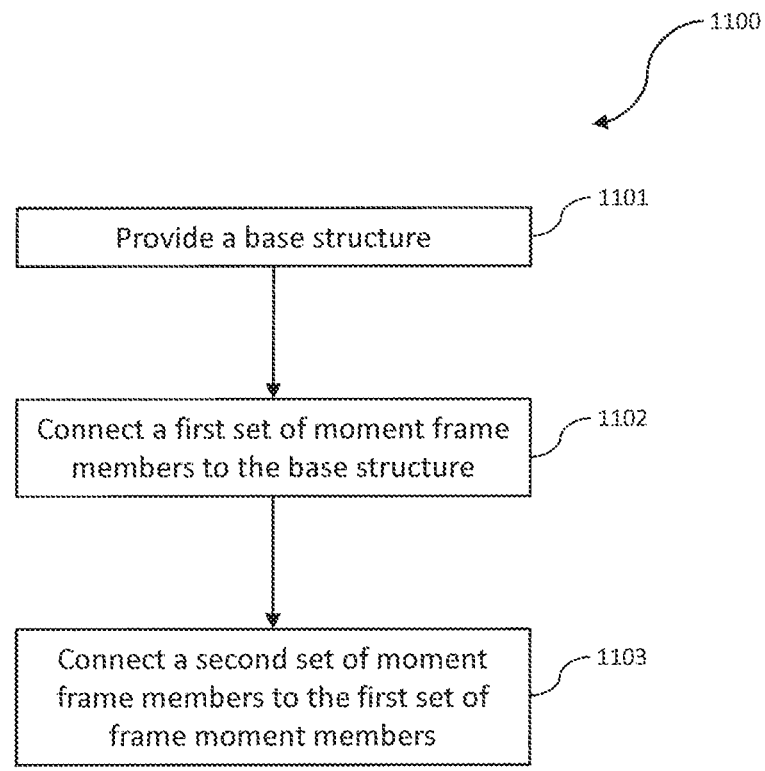
FIG. 11A is a flowchart of a method for assembling a support structure.

Referring to FIGS. 11A, 11B, 11C and 11D, a method for connecting a set of moment frame members is described. Referring to FIG. 11A, at step 1101, a base structure is provided. In a preferred embodiment, the base structure is a set of generally vertical pre-cast concrete columns. In other embodiments, any type of base structure known in the art may be employed. At step 1102, a first set of moment frame members is connected to the base structure. At step 1103 a second set of moment frame members is connected to the first set of moment members. In a preferred embodiment, the second set of moment members are positioned generally perpendicularly with respect to the first set of moment members.

In a preferred embodiment, each of the first set of moment members and the second set of moment members has a connection system as previously described in connection systems 100 and/or 600. It will be appreciated by those skilled in the art that the disclosed method provides a modular construction and assembly of a pre-cast structure, without the need for external bracing.

Figure 11B:
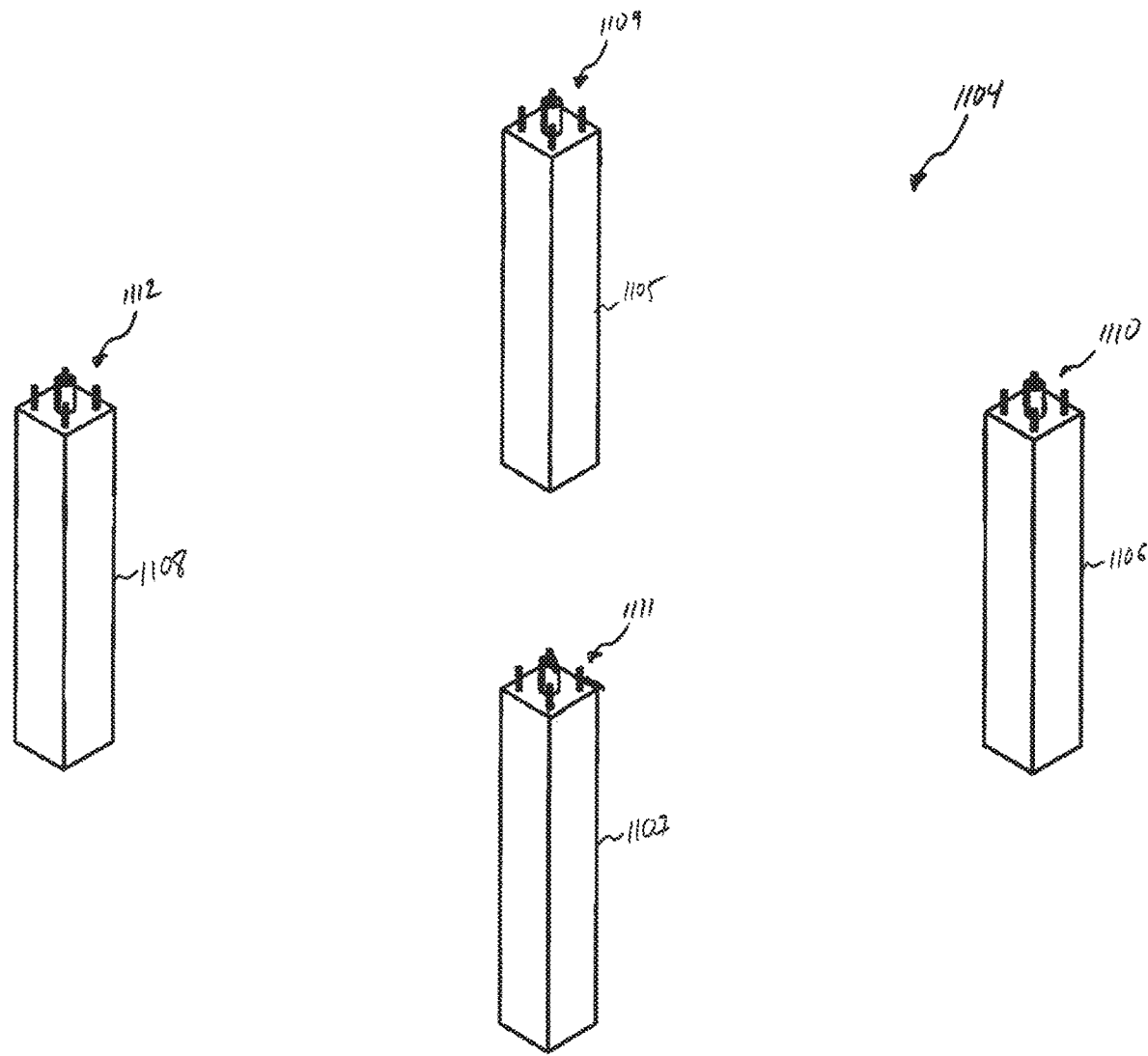
FIG. 11B is a perspective view of a base structure.

Referring to FIG. 11B, base structure 1104 includes columns 1105, 1106, 1107, and 1108. Column 1105 includes male connector 1109. Column 1106 includes male connector 1110. Column 1107 includes male connector 1111. Column 1108 includes male connector 1112.

Figure 11C:
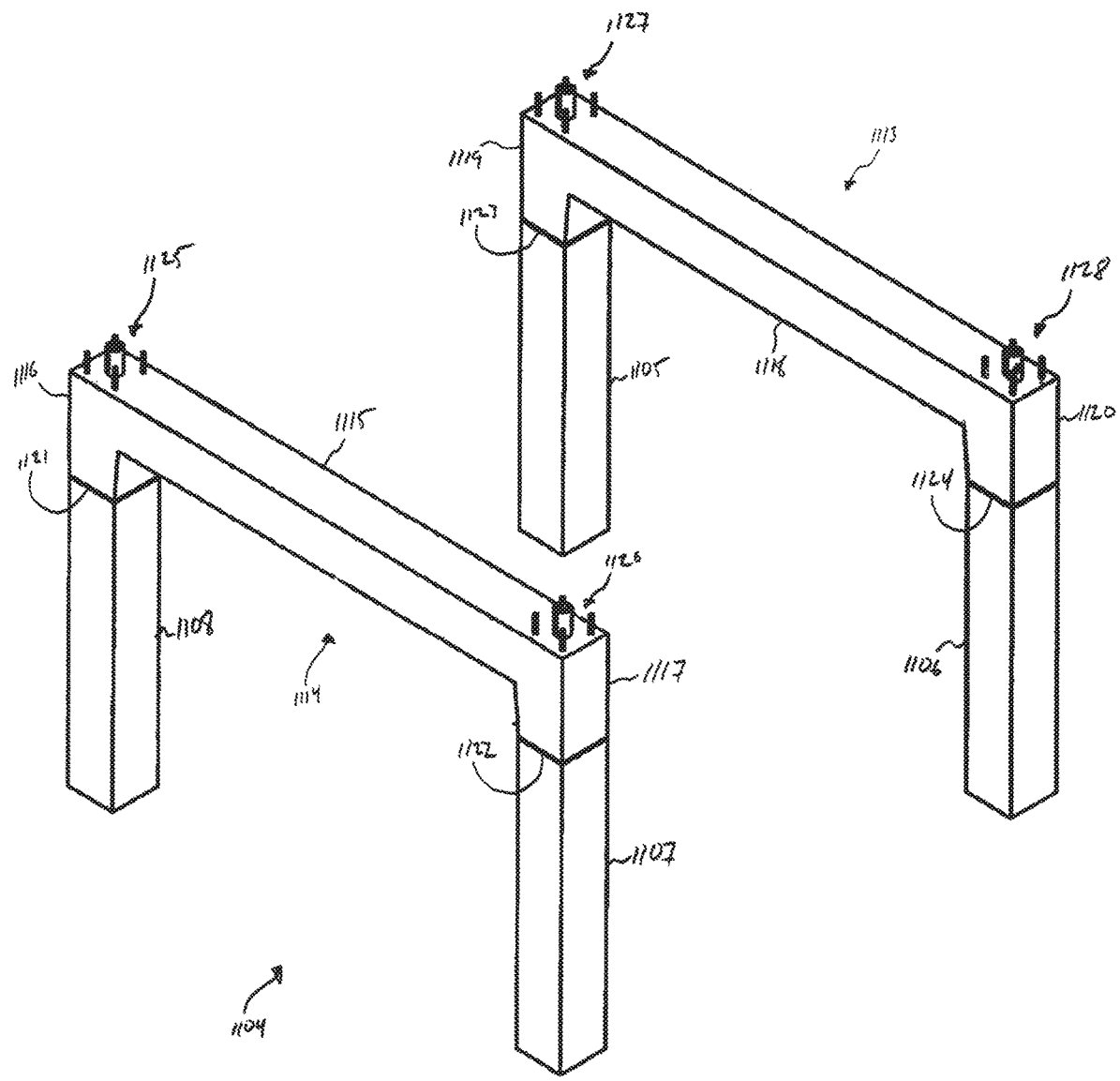
FIG. 11C is a perspective view of a first set of moment members connected to the base structure.

Referring to the FIG. 11C, moment frame members 1113 and 1114 are connected to base structure 1104. Moment frame member 1113 includes beam 1118 and connector portions 1119 and 1120. Connector portion 1119 includes male connector 1127 and female connector 1123 opposite male connector 1127. Connector portion 1120 includes female connector 1124 and male connector 1128 opposite female connector 1124. Moment frame member 1113 is connected to vertical columns 1105 and 1106 using female connectors 1123 and 1124 as previously described in connection systems 100 and/or 600. Moment frame member 1114 includes beam 1115 and connector portions 1116 and 1117. Connector portion 1116 includes female connector 1121 and male connector 1125 opposite female connector 1121. Connector portion 1117 includes female connector 1122 and male connector 1126 opposite female connector 1122. Moment frame member 1114 is connected to vertical columns 1107 and 1108 with female connectors 1121 and 1122 as previously described in connection systems 100 and/or 600.

Figure 11D:
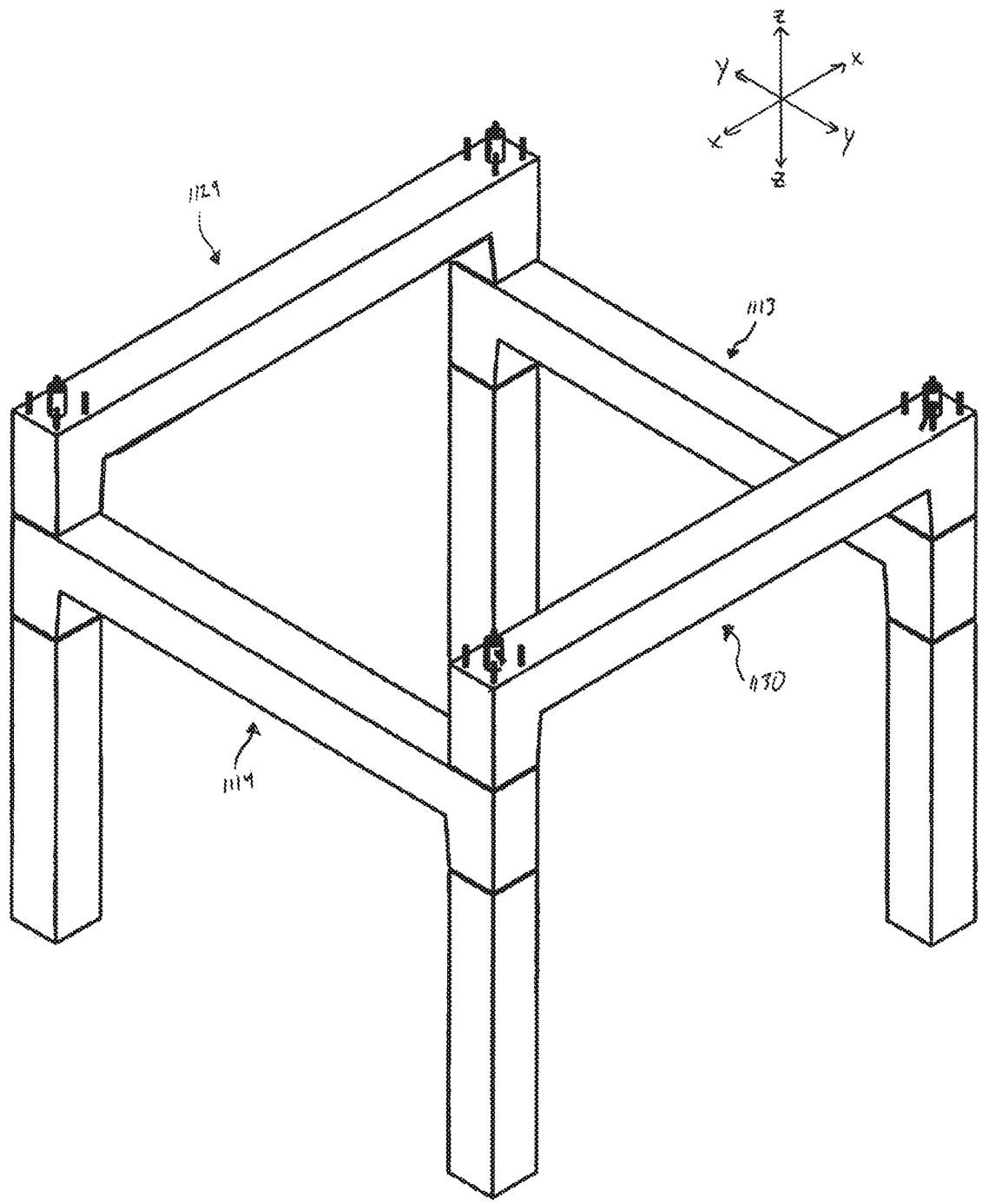
FIG. 11D is a perspective view of a second set of moment frame members connected to the first set of moment frame members and the first set of moment frame members connected to the base structure.

Referring to FIG. 11D, moment frame members 1129 and 1130 are connected to moment frame members 1114 and 1113. Moment frame members 1129 and 1130 are substantially the same as moment frame members 1113 and 1114.

As can be seen, moment members 1113 and 1114 are generally aligned along the y-axis and moment frame members 1129 and 1130 are generally aligned along the x-axis, thereby providing a transverse connection system. As can further be seen, the connection systems of the disclosed embodiments provide two-way moment bracing generally along the x-axis and the y-axis. Further, the connection of these disclosed embodiments eliminate the need for external bracing along the x-axis and the y-axis, and enable the assembly of a free-standing structure.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in acclaimed structure or method.

The invention claimed is:

1. A connection system for a two-way moment frame member comprising:
   a stabilizer receiver comprising an end surface positioned at a receiver length;
   a set of sleeves adjacent to the stabilizer receiver extending generally parallel to the stabilizer receiver;
   a collapsible stabilizer, sized to extend to at most the end surface, at least partially collapse when engaged with the stabilizer receiver, and to provide a frictional engagement with the stabilizer receiver;
   a single slot integrally and linearly formed in the collapsible stabilizer; wherein the single slot is generally parallel to an axis of the collapsible stabilizer;
   a notch integrally formed in the collapsible stabilizer;
   a set of rebars adjacent to the collapsible stabilizer extending generally parallel to the collapsible stabilizer; and,
   wherein the collapsible stabilizer has a curved planar surface to form the single slot therein.

2. The connection system of claim 1, further comprising a stabilizer pin attached to the stabilizer receiver.

3. The connection system of claim 1, further comprising a taper adjacent to the stabilizer receiver.

4. The connection system of claim 1, wherein the stabilizer receiver is generally frustoconical in shape.

5. The connection system of claim 1, wherein the stabilizer receiver is generally cylindrical in shape.

6. A two-way moment frame member comprising:
   a beam;
   a set of connector portions attached to the beam;
   a male connector, comprising a collapsible stabilizer attached to each connector portion of the set of connector portions, and a set of rebars attached to each connector portion of the set of connector portions, adjacent to the collapsible stabilizer, and extending generally parallel to the collapsible stabilizer;
   a female connector opposite the male connector, comprising a stabilizer receiver comprising an end surface positioned at a receiver length, attached to each connector portion of the set of connector portions, and a set of sleeves attached to each connector portion of the set of connector portions, adjacent to the stabilizer receiver, and extending generally parallel to the stabilizer receiver;
   a single slot integrally and linearly formed in the collapsible stabilizer; wherein the single slot is generally parallel to an axis of the collapsible stabilizer;
   a notch integrally formed in the collapsible stabilizer;
   wherein the collapsible stabilizer is sized to extend to at most the end surface and provide a frictional engagement; and,
   wherein the collapsible stabilizer has a curved planar surface to form the single slot therein.

7. The two-way moment frame member of claim 6, further comprising a stabilizer pin attached to the stabilizer receiver.

8. The two-way moment frame member of claim 6, wherein each connector portion is generally perpendicular with respect to the beam.

9. The two-way moment frame member of claim 6, further comprising a taper adjacent to and surrounding the stabilizer receiver.

10. A two-way moment support structure comprising:
    a base structure;
    a set of moment frame members connected to the base structure, each moment frame member of the set of moment frame members comprising:
        a beam;
        a set of connector portions attached to the beam;
        a collapsible stabilizer attached to each connector portion of the set of connector portions;
        a single slot integrally and linearly formed in the collapsible stabilizer; wherein the single slot is generally parallel to an axis of the collapsible stabilizer;
        a notch integrally formed in the collapsible stabilizer;
        a set of rebars attached to each connector portion of the set of connector portions, adjacent to the collapsible stabilizer, and extending generally parallel to the collapsible stabilizer;
        a stabilizer receiver comprising a receiver length, integrally formed in each connector portion of the set of connector portions, opposite the collapsible stabilizer;
        a set of sleeves integrally formed in each connection portion of the set of connector portions, opposite the set of rebars, and extending generally parallel to the stabilizer receiver;
        wherein the collapsible stabilizer is sized to extend to at most the receiver length and provide a frictional engagement; and,
        wherein the collapsible stabilizer has a curved planar surface to form the single slot therein.

11. The two-way moment support structure of claim 10, further comprising a stabilizer pin attached to the stabilizer receiver.

12. The two-way moment support structure of claim 10, further comprising:
   a first subset of the set of moment frame members connected to the base structure; and,
   a second subset of the set of moment frame members generally perpendicularly connected to the first subset.

13. The two-way moment support structure of claim 10, wherein the base structure comprises a set of columns.

14. The two-way moment support structure of claim 13, wherein the base structure further comprises a male connector attached to each column of the set of columns.

15. The two-way moment support structure of claim 10, wherein the two-way moment support structure is a free-standing structure.

16. A method for assembling a free-standing structure comprising the steps of:
   providing a set of moment frame members, each moment frame member comprising a set of female frame connectors and a set of collapsible male frame connectors, opposite the set of female frame connectors, wherein each female frame connector of the set of female frame connectors comprises:
      a stabilizer receiver comprising an end surface positioned at a receiver length;
      a set of sleeves adjacent to the stabilizer receiver extending generally parallel to the stabilizer receiver; and,
      a stabilizer pin attached to the stabilizer receiver;
   and wherein each collapsible male frame connector of the set of collapsible male frame connectors comprises:
      a collapsible frame stabilizer, sized to extend to at most the end surface, at least partially collapse when engaged with the stabilizer receiver, and to provide a frictional engagement with the stabilizer receiver;
      a single frame slot integrally and linearly formed in the collapsible frame stabilizer; wherein the single frame slot is generally parallel to an axis of the collapsible frame stabilizer;
      a frame notch integrally formed in the collapsible frame stabilizer;
      a set of frame rebars adjacent to the collapsible frame stabilizer extending generally parallel to the collapsible frame stabilizer; and,
      wherein the collapsible frame stabilizer has a curved planar frame surface to form the single frame slot therein;
   providing a base structure comprising a set of collapsible male base connectors, wherein each collapsible male base connector of the set of collapsible male base connectors comprises:
      a collapsible base stabilizer, sized to extend to at most the end surface, at least partially collapse when engaged with the stabilizer receiver, and to provide a frictional engagement with the stabilizer receiver;
      a single base slot integrally and linearly formed in the collapsible base stabilizer; wherein the single base slot is generally parallel to an axis of the collapsible base stabilizer;
      a frame notch integrally formed in the collapsible frame stabilizer;
      a set of frame rebars adjacent to the collapsible frame stabilizer extending generally parallel to the collapsible frame stabilizer; and,
      wherein the collapsible frame stabilizer has a curved planar frame surface to form the single frame slot therein;
   providing a base structure comprising a set of collapsible male base connectors, wherein each collapsible male base connector of the set of collapsible male base connectors comprises:
      a collapsible base stabilizer, sized to extend to at most the end surface, at least partially collapse when engaged with the stabilizer receiver, and to provide a frictional engagement with the stabilizer receiver;
      a single base slot integrally and linearly formed in the collapsible base stabilizer; wherein the single base slot is generally parallel to an axis of the collapsible base stabilizer;
      a base notch integrally formed in the collapsible base stabilizer;
      a set of base rebars adjacent to the collapsible base stabilizer extending generally parallel to the collapsible base stabilizer; and,
      wherein the collapsible base stabilizer has a curved planar base surface to form the single base slot therein; and,
   connecting a first subset of the set of moment frame members to the base structure.

17. The method of claim 16, wherein the step of connecting the first subset further comprises the steps of:
   inserting the set of collapsible male base connectors into the set of female frame connectors of the first subset; and,
   collapsing at least a portion of each of the set of collapsible male base connectors.

18. The method of claim 16, further comprising the step of connecting a second subset of the set of moment frame members to the first subset.

19. The method of claim 18, wherein the step of connecting the second subset further comprises the steps of:
   positioning the second subset generally perpendicular to the first subset;
   inserting the set of collapsible male frame connectors of the first subset into the set of female frame connectors of the second subset; and,
   collapsing at least a portion of each of the set of collapsible male frame connectors of the first subset.

* * * * *